(12) United States Patent
Zijlman et al.

(10) Patent No.: US 11,641,703 B2
(45) Date of Patent: May 2, 2023

(54) METHOD OF CONTROLLING A LIGHTING ARRANGEMENT, A LIGHTING CONTROL CIRCUIT AND A LIGHTING SYSTEM

(71) Applicant: SIGNIFY HOLDING B.V., Eindhoven (NL)

(72) Inventors: Theo Gerrit Zijlman, Tilburg (NL); Henricus Marius Joseph Maria Kahlman, Dongen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/625,014

(22) PCT Filed: Jul. 7, 2020

(86) PCT No.: PCT/EP2020/069054
§ 371 (c)(1),
(2) Date: Jan. 5, 2022

(87) PCT Pub. No.: WO2021/005027
PCT Pub. Date: Jan. 14, 2021

(65) Prior Publication Data
US 2022/0295611 A1    Sep. 15, 2022

(30) Foreign Application Priority Data

Jul. 9, 2019 (EP) .................................. 19185137
Jul. 18, 2019 (EP) .................................. 19186930

(51) Int. Cl.
*H05B 45/18* (2020.01)
*H05B 45/34* (2020.01)
*H05B 45/46* (2020.01)
*H05B 45/347* (2020.01)
*H05B 45/325* (2020.01)
*H05B 45/375* (2020.01)

(52) U.S. Cl.
CPC ........... *H05B 45/18* (2020.01); *H05B 45/325* (2020.01); *H05B 45/34* (2020.01); *H05B 45/347* (2020.01); *H05B 45/375* (2020.01); *H05B 45/46* (2020.01)

(58) Field of Classification Search
CPC ...... H05B 45/18; H05B 45/325; H05B 45/34; H05B 45/347; H05B 45/375; H05B 45/46; H05B 45/00; H05B 45/345
See application file for complete search history.

(56) References Cited

U.S. PATENT DOCUMENTS 9,161,415 B2 * 10/2015 Catalano ................ G01K 13/00
2002/0030455 A1    3/2002 Ghanem
2003/0235062 A1   12/2003 Burgyan et al.
(Continued)

FOREIGN PATENT DOCUMENTS

WO    WO-2019198604 A1 * 10/2019 ........... B60Q 1/1407

*Primary Examiner* — Daniel D Chang

(57) ABSTRACT

A lighting arrangement such as a LED lamp comprises a light source and associated current driver, or a set of at least two parallel light sources and associated current drivers, supplied by a DC voltage from a voltage-regulated power converter. A feedback circuit provides a temperature-dependent control input to a control loop of the power converter, such that the DC voltage is adjusted in dependence on a sensed temperature. In this way, the voltage headroom required can be reduced, and efficiency gains are made.

13 Claims, 3 Drawing Sheets

(56) References Cited

U.S. PATENT DOCUMENTS

| | | |
|---|---|---|
| 2004/0164685 A1 | 8/2004 | Dygert |
| 2009/0015759 A1 | 1/2009 | Honbo |
| 2009/0295775 A1 | 12/2009 | Kim et al. |
| 2010/0264832 A1* | 10/2010 | Archenhold ........... H05B 45/24 |
| | | 315/186 |
| 2010/0283397 A1* | 11/2010 | Chen ...................... H05B 45/46 |
| | | 315/192 |
| 2018/0014370 A1 | 1/2018 | Wang et al. |

* cited by examiner

METHOD OF CONTROLLING A LIGHTING ARRANGEMENT, A LIGHTING CONTROL CIRCUIT AND A LIGHTING SYSTEM

CROSS-REFERENCE TO PRIOR APPLICATIONS

This application is the U.S. National Phase application under 35 U.S.C. § 371 of International Application No. PCT/EP2020/069054, filed on Jul. 7, 2020, which claims the benefits of European Patent Applications Nos. 19186930.4, filed on Jul. 18, 2019 and 19185137.7, filed on Jul. 9, 2019. These applications are hereby incorporated by reference herein.

FIELD OF THE INVENTION

This invention relates to the control of lighting systems, for example (but not exclusively) multi-channel lighting systems. Multiple channels can for example provide color mixing and color temperature control, although other effects can also be obtained by using multiple light sources.

BACKGROUND OF THE INVENTION

There are various known multi-channel LED light sources. One possible arrangement makes use of different color channels in parallel. Each channel may for example independently provide a different color output. Alternatively, different LEDs may be provided in series, and bypass switches can be used to select which LEDs are activated, and thereby control the output color.

Such a system for example may generate white light by driving red, green and blue LEDs independently. Note that in practice, a green LED may make use of a native blue LED and a green phosphor layer. White light can be generated with different color temperatures, for example having separate LED strings to generate cold white or warm white from a single luminaire. Alternatively, such systems can provide full output color control.

In addition, multi-channel LED drivers are also encountered in LED modules or LED luminaires in which different channels are used to generate separate beams for general lighting and task lighting.

In current systems, separate drivers are used for different LEDs (or LED strings) of the module. This may for example be required as a result of the different load dependencies of the different channels.

In general, in a multi-channel system, each channel does not always run at maximum power. In many situations, pulse width modulation (PWM) is used to control the power on one channel, meaning that the power on that channel is only drawn during a certain fraction of the time.

FIG. 1 shows in schematic form a conventional multi-channel lighting system driver circuit. Three LED loads 10,11,12 are shown, which may for example have three different color outputs. Each is driven by a respective driver 20,21,22 which essentially comprises a switch mode power supply (SMPS) or linear driver which implements PWM control. There is a global AC-DC converter 14, which may for example include power factor correction, and a global controller 16 which is remote to the actual light sources themselves. The global controller 16 provides commands to the local drivers 20,21,22 to control the operation of the LED loads.

This approach has a two-stage driver concept. One driver stage is to convert the mains voltage to an intermediate DC voltage and the other is to convert the intermediate DC voltage to a LED current. The multiple LED channels are then controlled independently from each other.

FIG. 2 shows one example of an implementation of the arrangement shown schematically in FIG. 1. It comprises the AC-DC converter 14 which delivers a constant voltage output Vout, and each individual driver is shown as DC current source I1 to I3, with the channels all in parallel. Each current source has a current sense resistor R1 to R3. The current sources are controlled using pulse width modulation, with control signals PWM1 to PWM3. The current sense resistors are used to set a fixed current level. This is a low cost solution with a linear driver per channel.

The LED arrangements for example have different color points. They may be different types of white (warm white, cool white, flame white . . . ) or different colors.

A disadvantage of this arrangement is the efficiency. In particular, the bus voltage (the output voltage Vout) needs to be higher than the forward voltage of the LED string with the highest forward voltage. This maximum voltage is determined by the voltage bins, the number of LEDs, the drive current and the temperature.

Losses in each channel are then proportional to the voltage difference between the set bus voltage and the LED (in particular LED string) forward voltage.

In order to optimize driver efficiency, the voltage drop across the current sources I1 to I3 should be minimized, by operating the bus voltage at the lowest possible level. There is therefore a need to maintain the bus voltage as low as possible.

SUMMARY OF THE INVENTION

The invention is defined by the claims.

According to examples in accordance with an aspect of the invention, there is provided a lighting control circuit for controlling a lighting arrangement, comprising:

a power converter for delivering a DC voltage to current driver, wherein the current driver is for connection in series with the lighting arrangement for driving a current through the lighting arrangement, and wherein the power converter has a control loop for controlling the level of the DC voltage;

a temperature sensing element for sensing a temperature at or near the lighting arrangement; and a feedback circuit for providing a temperature-dependent control input to the control loop of the power converter, such that the DC voltage is adjusted in dependence on a sensed temperature.

The invention is based on the recognition that the efficiency when using a fixed DC voltage (generally termed the bus voltage) is temperature-dependent. When LEDs are cold at start-up, the bus voltage should be high enough to guarantee enough voltage headroom for correct operation of the current driver, which may for example comprise a linear current source. When the lamp is warmed up, the headroom will increase the because LED forward voltage decreases and hence the total losses will increase.

The invention is based on regulating the DC voltage using a feedback circuit in the voltage control loop of the power converter.

The DC voltage is preferably adjusted inversely with respect to temperature. In this way, at high temperature the bus voltage is adjusted to a lower voltage level to increase the efficiency. At start-up with low temperature, the control loop increases the DC voltage to compensate for the cold LEDs.

In this way, the efficiency is improved, by dynamically adjusting the voltage headroom to match the temperature of operation.

The feedback circuit for example comprises a resistor network, and the temperature sensing element comprises at least one temperature sensitive resistor in the resistor network.

This provides a simple and low cost way to generate a suitable feedback control signal for controlling the power converter.

The power converter for delivering a DC voltage for example comprises a switch mode power converter. It may have a voltage regulated output, and may for example have a rectified mains input. The power converter for example comprises a buck converter.

The invention also provides a lighting circuit comprising:
a lighting control circuit as defined above;
the current driver; and
the lighting arrangement, which comprises a light source in series with the current driver, the series combination supplied with the DC voltage, and the light source comprising a LED arrangement through which current is driven by the current driver.

This provides the combination of the lighting control circuit, and the lighting arrangement (which in this case may be a single LED string light source) and current driver which are driven by the lighting control circuit.

The invention also provides a lighting circuit comprising:
a lighting control circuit as defined above;
a set of parallel current drivers; and
the lighting arrangement, comprising a set of parallel LED arrangements, wherein each LED arrangement is in series with a respective current driver which drives current through the LED arrangement, and each series combination is supplied with the DC voltage.

The lighting control circuit is in this case used to control a lighting arrangement comprising a set of at least two light sources (together forming the lighting arrangement) comprising a first light source and a second light source in parallel, wherein the power converter is for delivering a DC voltage to a set of parallel current drivers. The DC voltage is the power supply to the current drivers and their associated LED arrangements.

The current drivers for example each comprise a constant current source circuit. The current drivers may each comprise a pulse width modulation control input. In this way, the drive level to the light sources is adapted in a time division manner. The frequency of the pulse width modulation is high enough that visible flicker is not perceived, for example in the kHz range (e.g. 500 Hz to 10 kHz).

A respective current sense resistor is for example in series with each current driver. This is used to set the current level of the current driver.

When multiple LED arrangements are used in parallel, they for example have different color points. They may be different types of white (warm white, cool white, flame white . . . ) or different colors.

The temperature sensing element of the lighting control circuit is preferably in close proximity to one of the LED arrangements or thermally coupled to one of the LED arrangements. This provides optimum operation of the feedback control. The one of the LED arrangements is for example the LED arrangement with the largest forward voltage. This is the LED arrangement for which the headroom control is most critical.

The invention also provides a method of controlling a lighting arrangement, comprising:

delivering a DC voltage to a current driver using a power converter, the power converter having a control loop for controlling the level of the DC voltage;

sensing a temperature at or near a light source;

providing a temperature-dependent control input to the control loop of the power converter, such that the DC voltage is adjusted in dependence on a sensed temperature; and driving the light source using the current driver.

The method is for example for controlling a lighting arrangement comprising a set of at least two light sources comprising a first light source and a second light source in parallel, wherein the method comprises delivering a DC voltage to a set of parallel current drivers using the power converter and driving the light sources using the current drivers.

The method for example comprises adjusting the DC voltage inversely with respect to temperature.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
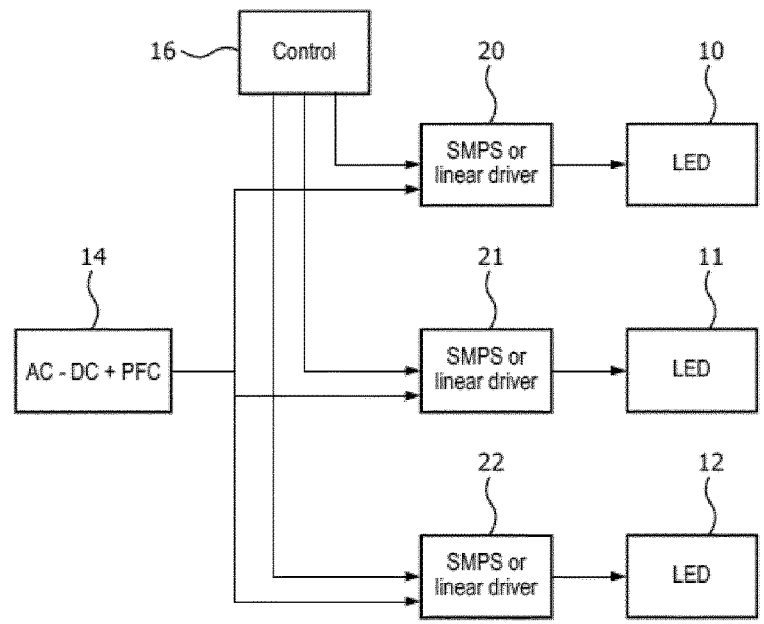
FIG. 1 shows in schematic form a known lighting control architecture for driving multiple lighting channels.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lighting arrangement such as a LED lamp comprising a light source and associated current driver, or a set of at least two parallel light sources and associated current drivers, supplied by a DC voltage from a voltage-regulated power converter. A feedback circuit provides a temperature-dependent control input to a control loop of the power converter, such that the DC voltage used to power the current driver(s) and light source(s) is adjusted in dependence on a sensed temperature. In this way, the voltage headroom required can be reduced, and efficiency gains are made.

Figure 2:
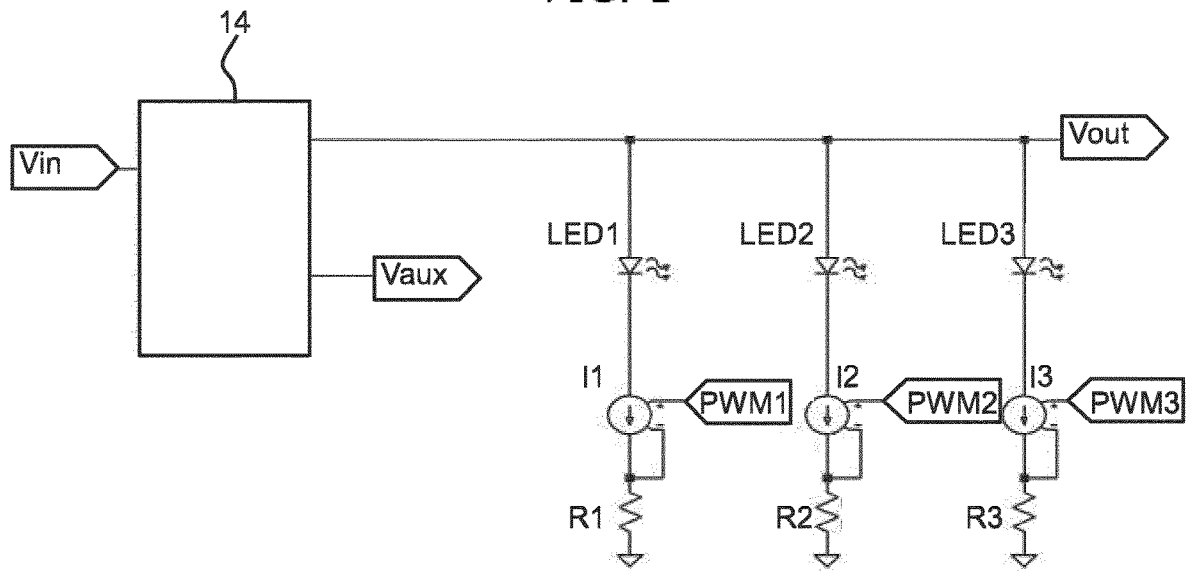
FIG. 2 shows one implementation of the lighting control architecture of FIG. 1.

In the known arrangement of FIG. 2, the current sense resistor sets the current making use of an internal reference. The light output flux (and hence color point) is set by the PWM signal.

When the PWM signal is set to zero, the current source is turned off and hence stops generating current. When the PWM signal is non-zero, the amplitude of the current waveform is set by the current sense resistor and internal reference, whereas the duty cycle, and hence average current, is set by the PWM signal.

The current sources are linear drivers, by which is meant there is no high frequency switching mode. Instead, they are implemented by a transistor current source circuit, with a sense resistor to set the current.

A major issue to solve is the temperature dependent efficiency when a fixed bus voltage is used as the voltage source. When LEDs are cold at start-up, the bus voltage needs to be high enough to guarantee enough headroom (voltage) for correct operation of the current sources. However, when the lamp and driver is warmed up, the headroom will increase because the LED forward voltage decreases and hence the total losses will increase.

This issue arises for an individual current driver or for a set of current drivers in parallel.

Figure 3:
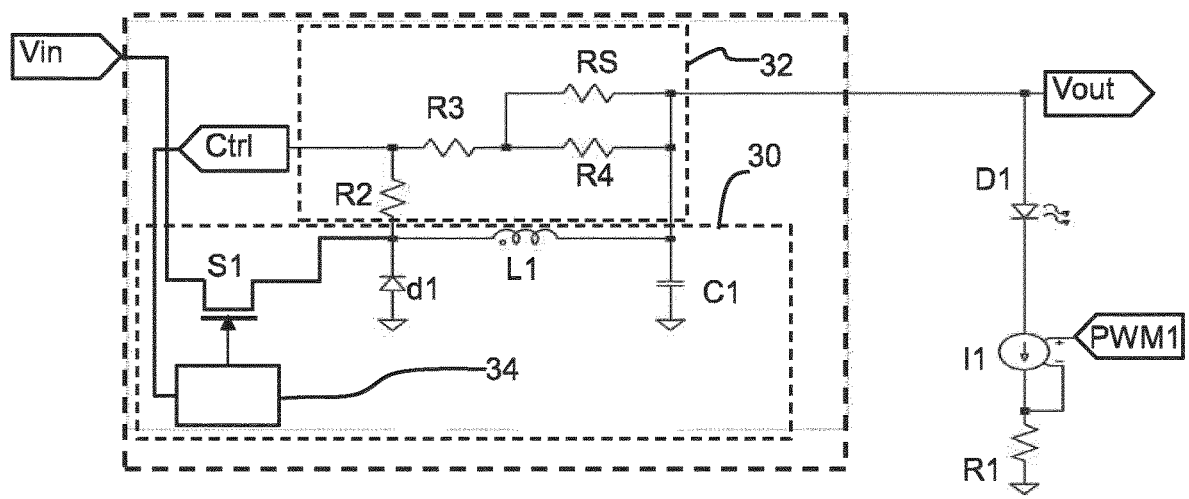
FIG. 3 shows a lighting control circuit of the invention, applied to the circuit architecture of FIG. 2.

FIG. 3 shows a lighting control circuit in accordance with one example of the invention, applied to the circuit architecture of FIG. 2. The overall circuit of FIG. 3 is a lighting circuit.

The lighting control circuit of FIG. 3 is shown coupled to a single current driver and light source. There may be only a single current driver, or else the lighting control circuit may be implemented as a circuit for controlling a lighting arrangement comprising a set of at least two current drivers comprising a first current driver and a second current driver in parallel. The (or each) current driver is connected in series with its associated light source. The current driver drives a current through the associated light source. The one or more light sources then form the lighting arrangement.

A power converter delivers a DC voltage Vout to the current driver or the set of parallel current drivers, the power converter having a control loop for controlling the level of the DC voltage Vout. The DC voltage Vout is the power supply to the (or each) series-connected current driver and light source.

The input Vin to the power converter is for example a signal received from a circuit including a full bridge diode rectifier and EMI filter (i.e. the AC/DC converter 14 of FIGS. 1 and 2). Thus, the converter circuit as shown typically receives a rectified mains input and is itself a DC/DC converter. Of course, the rectifier and EMI filter may instead be considered to be part of an overall AC/DC converter architecture.

The current driver shown in FIG. 3 comprises a first current source I1 and associated first current sense resistor R1, and the current driver is connected in series with a first light source D1, which itself is a LED arrangement (represented as a single diode D1, for simplicity).

The circuit comprises a constant voltage power converter 30. In the example of FIG. 3, this power converter is implemented as a buck converter. The buck converter comprises an energy storage inductor L1, diode d1 and storage capacitor C1. A switch S1 is provided between the cathode of the diode D1 and the input Vin.

A voltage feedback point for the control of the switch S1 is shown as a control pin Ctrl. It is provided to the power converter controller IC 34, which then controls the timing of operation of the main switch S1 to provide the regulated output voltage. The controller 34 implements the control loop of the power converter.

The switch S1 and controller 34 may be part of a power converter integrated circuit, such as a buck PFC constant-voltage regulator circuit.

The circuit further comprises a feedback circuit 32, in particular in the form of a resistor network R2, R3, R4, RS. The resistor RS is a temperature sensing element in particular in the form of a temperature sensitive resistor.

Resistor RS is the only temperature dependent element, formed as a negative temperature coefficient (NTC) resistor. The resistors R3, R4 and R2 form a voltage feedback circuit for generating the voltage feedback Ctrl and hence for controlling the output voltage.

Without the resistor RS, conventional voltage control is implemented. The resistor RS means the control input Ctrl to the controller 34 becomes temperature dependent. Thus, a temperature dependency is added to the control feedback used to control the timing of operation of the power converter main switch S1. The feedback resistor circuit is designed such that temperature has the desired influence on the regulated voltage control.

The control input Ctrl is supplied to the controller 34 and thereby introduced into the control loop of the power converter, such that the DC voltage is adjusted in dependence on the sensed temperature.

The DC voltage is adjusted inversely with respect to temperature. In this way, at high temperature the bus voltage is adjusted to a lower voltage level to increase the efficiency. At start-up with low temperature, the control loop increases the DC voltage to compensate for the cold LEDs.

The linear driver I1 is a fixed current source as explained above, for example with a 1 KHz PWM input. More generally, the current driver or drivers for example each comprise a pulse width modulation control input. In this way, the drive level to the light sources is adapted in a time division manner. The frequency of the pulse width modulation is high enough that visible flicker is not perceived, for example in the kHz range (e.g. 500 Hz to 10 kHz).

The LED load, i.e. the light source D1, is for example a single string of LEDs, such as 6 mid-power LEDs. The voltage across the inductor L1 at the reverse period is a measure of the output voltage.

The resistance of RS decreases at higher temperatures and hence the output voltage at the control pin Ctrl will increase. This for example corresponds to a lower output voltage because the reference level of a control pin is reached earlier, giving a shorter conduction period.

Conversely, at lower temperatures the resistance increases, so the Vctrl pin voltage decreases. This corresponds to an increase in the output voltage because the reference voltage of the control pin takes longer to be reached, giving a longer conduction period.

The invention is thus based on regulating the DC voltage using a feedback circuit in the voltage control loop of the power converter.

Figure 4:
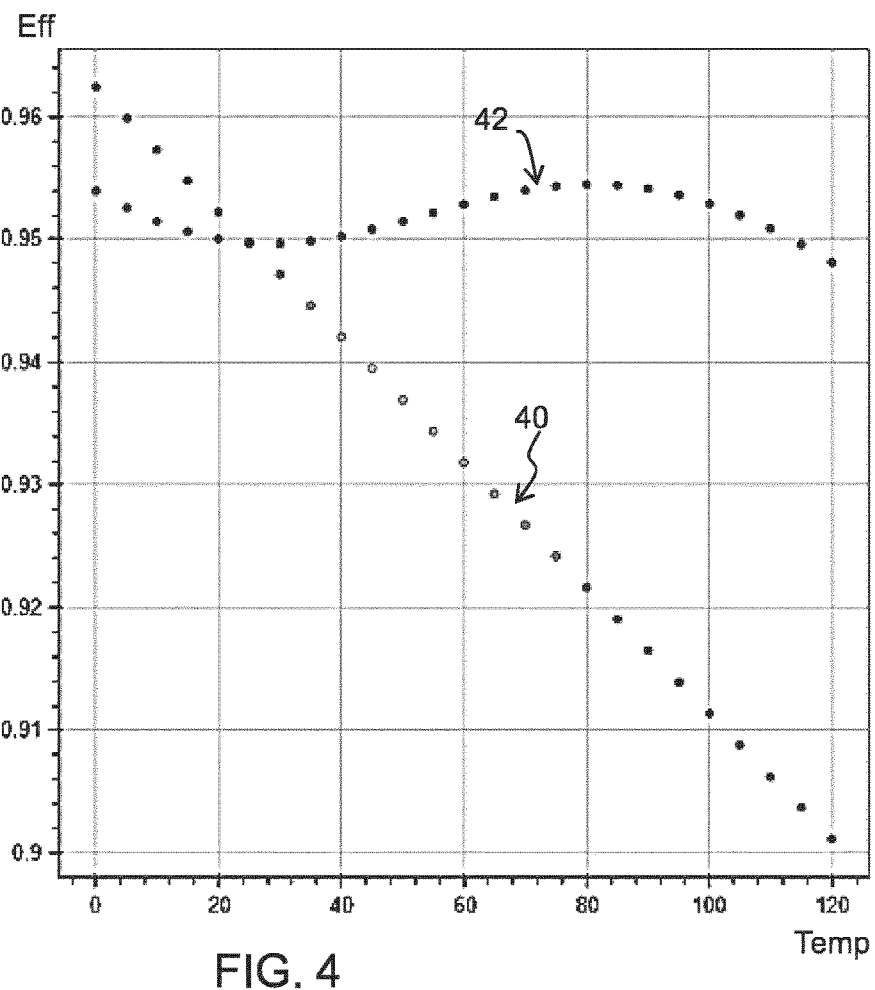
FIG. 4 shows the efficiency improvements obtained by the circuit of FIG. 3.

FIG. 4 shows a plot of efficiency versus temperature for the standard approach (plot 40) and for the implementation of FIG. 3 (plot 42).

Without the temperature compensation, the efficiency of the current source drops to 91% at 100 degrees, whereas an improvement of 5% is obtained with the temperature compensation described above.

FIG. 3 shows only one current source D1, but the lighting control circuit may comprise a set of parallel current drivers and associated light sources (as shown in FIG. 2), each supplied by the DC voltage. The DC voltage is the power supply to the current drivers. A respective current sense resistor is for example in series with each current driver.

The temperature sensing element of the lighting control circuit is preferably in close proximity to one of the LED arrangements or thermally coupled to one of the LED arrangements. This provides optimum operation of the feedback control. The one of the LED arrangements is for example the LED arrangement with the largest forward voltage. This is the LED arrangement for which the headroom control is most critical.

Figure 5:
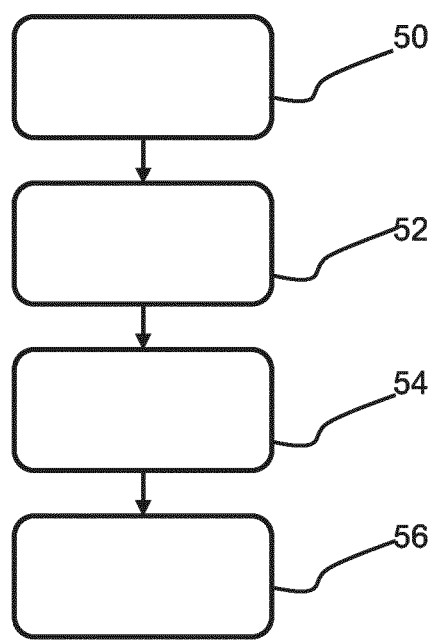
FIG. 5 shows a method of controlling a lighting arrangement.

FIG. 5 shows a method of controlling a lighting arrangement, which for example comprises a set of at least two light sources comprising a first light source and a second light source in parallel, the method comprising:

in step 50, delivering a DC voltage to the current driver or to the set of parallel current drivers using a power converter, the power converter having a control loop for controlling the level of the DC voltage;

in step 52, sensing a temperature at or near a light source;

in step 54, providing a temperature-dependent control input to the control loop of the power converter, such that the DC voltage is adjusted in dependence on a sensed temperature; and in step 56, driving the light source or light sources using the current driver(s).

The method for example comprises adjusting the DC voltage inversely with respect to temperature.

The invention is of primary interest for parallel switched current sources. However, it may be applied to a lamp with a single current source such as a one color, white, lamp.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A lighting control circuit for controlling a lighting arrangement, the lighting control circuit comprising:
   a power converter for delivering a DC voltage to a current driver, wherein the current driver is arranged to be connected in series with the lighting arrangement for driving a current through the lighting arrangement, and wherein the power converter has a control loop for controlling the level of the DC voltage;
   a temperature sensing element for sensing a temperature at or near the lighting arrangement and arranged to be used in a feedback circuit; and
   the feedback circuit arranged to receive the measured voltage and arranged to provide a temperature-dependent control input to the control loop of the power converter, such that the DC voltage is adjusted in dependence on a sensed temperature, wherein the DC voltage is adjusted inversely with respect to sensed temperature.

2. The lighting control circuit as claimed in claim 1, for controlling a lighting arrangement comprising a set of at least two light sources comprising a first light source and a second light source in parallel, wherein the power converter is for delivering a DC voltage to a set of parallel current drivers.

3. The lighting control circuit as claimed in claim 1, wherein the feedback circuit comprises a resistor network, and wherein the temperature sensing element comprises at least one temperature sensitive resistor in the resistor network.

4. The lighting control circuit as claimed in claim 1, wherein the power converter for delivering a DC voltage comprises a switch mode power converter.

5. The lighting control circuit as claimed in claim 4, wherein the power converter for delivering a DC voltage comprises a buck converter.

6. A lighting circuit comprising:
   a lighting control circuit as claimed in claim 1;
   the current driver; and
   the lighting arrangement, which comprises a light source in series with the current driver, the series combination supplied with the DC voltage, and the light source comprising a LED arrangement through which current is driven by the current driver.

7. The lighting circuit as claimed in claim 6, wherein the current driver comprises a constant current source circuit, wherein the or each current driver comprises a pulse width modulation control input.

8. The lighting circuit as claimed in claim 7, further comprising a current sense resistor in series with the current driver.

9. A lighting circuit comprising:
   a lighting control circuit as claimed in claim 1;
   a set of parallel current drivers; and
   the lighting arrangement, comprising a set of parallel LED arrangements, wherein each LED arrangement is in series with a respective current driver which drives current through the LED arrangement, and each series combination is supplied with the DC voltage.

10. The lighting circuit as claimed in claim 9, wherein the temperature sensing element of the lighting control circuit is in close proximity to one of the LED arrangements or thermally coupled to one of the LED arrangements.

11. The lighting circuit as claimed in claim 10, wherein the one of the LED arrangements is the LED arrangement with the largest forward voltage.

12. A method of controlling a lighting arrangement, comprising:
   delivering a DC voltage to a current driver using a power converter, the power converter having a control loop for controlling the level of the DC voltage;
   sensing a temperature at or near a light source;
   providing a temperature-dependent control input based on the sensed temperature and on a measured voltage over an inductor of the power converter to the control loop of the power converter, such that the DC voltage is adjusted in dependence on a sensed temperature; and
   driving the light source using the current driver, and adjusting the DC voltage inversely with respect to sensed temperature.

13. The method as claimed in claim 12 for controlling a lighting arrangement comprising a set of at least two light sources comprising a first light source and a second light source in parallel, wherein the method comprises delivering the DC voltage to a set of parallel current drivers using the power converter and driving the light sources using the current drivers.

* * * * *